US006483803B1

(12) United States Patent
Elahmadi et al.

(10) Patent No.: US 6,483,803 B1
(45) Date of Patent: *Nov. 19, 2002

(54) APPARATUS AND METHOD FOR RESTORING FIBER OPTIC COMMUNICATIONS NETWORK CONNECTIONS

(75) Inventors: Siraj Nour Elahmadi, Dallas, TX (US); Paul Arthur Bullock, Plano, TX (US); Kesavamurthy Nagaraj, Plano, TX (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,433

(22) Filed: Jul. 11, 1997

Related U.S. Application Data

(63) Continuation-in-part of application No. 08/707,440, filed on Sep. 4, 1996, now Pat. No. 5,933,258.

(51) Int. Cl.[7] .............................................. G01R 31/08
(52) U.S. Cl. ........................ 370/216; 370/225; 370/535
(58) Field of Search ................................. 370/216, 537, 370/242, 244, 217, 218, 219, 220, 221, 222, 223, 535, 224, 536, 254; 395/110, 114, 117, 128, 115, 180, 181, 182.01, 182.02; 359/115, 124, 114, 110

(56) References Cited

U.S. PATENT DOCUMENTS

| | | | |
|---|---|---|---|
| 5,159,595 A | | 10/1992 | Flanagan et al. ........... 370/224 |
| 5,442,623 A | | 8/1995 | Wu |
| 5,446,725 A | | 8/1995 | Ishiwatari |
| 5,452,124 A | * | 9/1995 | Baker .......................... 359/341 |
| 5,457,555 A | | 10/1995 | Moriyama |
| 5,457,556 A | * | 10/1995 | Shiragaki ..................... 359/117 |
| 5,636,205 A | | 6/1997 | Suzuki et al. |
| 5,647,035 A | | 7/1997 | Cadeddu et al. |

(List continued on next page.)

FOREIGN PATENT DOCUMENTS

| | | |
|---|---|---|
| EP | 468 813 A1 | 1/1992 |
| FR | 2 714 557 | 6/1995 |

OTHER PUBLICATIONS

Yutaka Katsuyama et al. "Survivable Optical Fiber Architecture Employing Ultra–Wavelegth–Insensitive Switch and Coupler", Journal of Lightwave Technology, vol. 11 No. 12, Dec. 1, 1993, pp. 2177–2181.

IEEE Journal of Lightwave Technology, "Multiwavelength Survivable Ring Network Architectures" A.F. Elrefaie, Bellcore, Red Bank, NJ 07701, USA, Pub: May 23,1993, pp. 1245–1251.

*Primary Examiner*—Dang Ton
*Assistant Examiner*—Brian Nguyen
(74) *Attorney, Agent, or Firm*—Withrow & Terranova, P.L.L.C.

(57) ABSTRACT

A system and method for connecting traffic along a communications network is accomplished by rerouting traffic upon the detection of a fault condition along a primary connection path. Signals are divided into different wavelength regions labeled red and blue, respectively. The wavelength bands between transmit and receive channels are alternated between red and blue band regions and then combined, multiplexed or "bundled" together by a wideband wavelength division multiplexer in a single non wavelength specific transmission medium for connection to a single uni-directional Optical Cross Connect System (OCCS) port. Additionally, the receiving end of a single medium is connected to a wavelength division multiplexer which unbundles the combined red and blue band signals upon reception.

18 Claims, 3 Drawing Sheets

U.S. PATENT DOCUMENTS

| | | | | |
|---|---|---|---|---|
| 5,663,820 A | * | 9/1997 | Shiragaki | 359/128 |
| 5,731,887 A | * | 3/1998 | Fee | 359/110 |
| 5,757,526 A | * | 5/1998 | Shiragaki et al. | 359/110 |
| 5,777,761 A | * | 7/1998 | Fee | 359/110 |
| 5,793,909 A | * | 8/1998 | Leone et al. | 385/24 |
| 5,801,858 A | * | 9/1998 | Robert et al. | 359/114 |
| 5,884,017 A | * | 3/1999 | Fee | 714/4 |
| 5,933,258 A | * | 8/1999 | Flanagan et al. | 359/110 |
| 6,005,694 A | * | 12/1999 | Liu | 359/110 |

\* cited by examiner

APPARATUS AND METHOD FOR RESTORING FIBER OPTIC COMMUNICATIONS NETWORK CONNECTIONS

RELATED APPLICATIONS

This application is a Continuation-in-Part application of U.S. patent application serial No. 08/707,440, filed Sep. 4, 1996, entitled OPTICAL COMMUNICATION SYSTEM, now U.S. Pat. No. 5,933,258.

BACKGROUND OF THE INVENTION

1. Field of the Invention

The present invention relates generally to communications systems and specifically to fault tolerant fiber optic communication networks.

2. Description of the Related Art

Fiber optic communication systems are traditionally deployed in a point-to-point terminal configuration along a single path. A problem occurs if the connection path is somehow interrupted either due to equipment failure or a physical disruption in the connection.

Sonet self healing ring architectures may be a solution that protects against service disruption and node failure along a given primary path. Referring to FIG. 1, a ring architecture is presented, with nodes 120, 130, 140 and 150 all residing on ring 110. If a message to be transmitted from node 150 to node 130 clockwise along path A-B of ring 110 cannot be completed due to a failure in path B, then the message is routed counter-clockwise along alternate path D-C. In fact, in this architecture messages from node 120 intended for any node are also routed counter-clockwise to the intended destination node.

Drawbacks to the above system include the requirement for having expensive add/drop multiplexers and associated support equipment present in each node.

Most installed networks are point-to-point systems. Balancing traffic around a ring can be difficult. Further, managing an all-ring network and provisioning demands across several interconnected rings is more difficult and expensive than in a point to point network.

There is accordingly a need for a new method and apparatus for inexpensively and easily rerouting traffic between nodes in a communication network when a given path becomes unusable in order to solve or ameliorate one or more of the above-described problems.

SUMMARY OF THE INVENTION

According to a preferred embodiment of the present invention, a system and method for connecting traffic along a communications network is accomplished by rerouting traffic upon the detection of a fault condition along a primary connection path.

In an embodiment of the present invention, wavelengths are divided into different regions labeled red and blue, respectively. The wavelength bands between transmit and receive channels are alternated between red and blue band regions and then combined, multiplexed or "bundled" together by a non wavelength specific wideband wavelength division multiplexer in a single transmission medium for connection to a single uni-directional Optical Cross Connect System (OCCS) port. The different number of regions may be any even number of regions as long as the wavelengths are alternated.

Additionally, the receiving end of a single medium is connected to a wavelength division demultiplexer which unbundles the combined red and blue band signals upon reception.

In other words, a red band signal is bundled with a blue band signal for transmission through a single medium where it is received and then unbundled into its red and blue components by a wavelength division multiplexer at the receiver.

An analogous method and apparatus is used to transmit a signal in the opposite direction when and if required for full duplex operation.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

Note that generally the first digit of an item corresponds to the first figure in which that item is illustrated.

DETAILED DESCRIPTION

Figure 1:
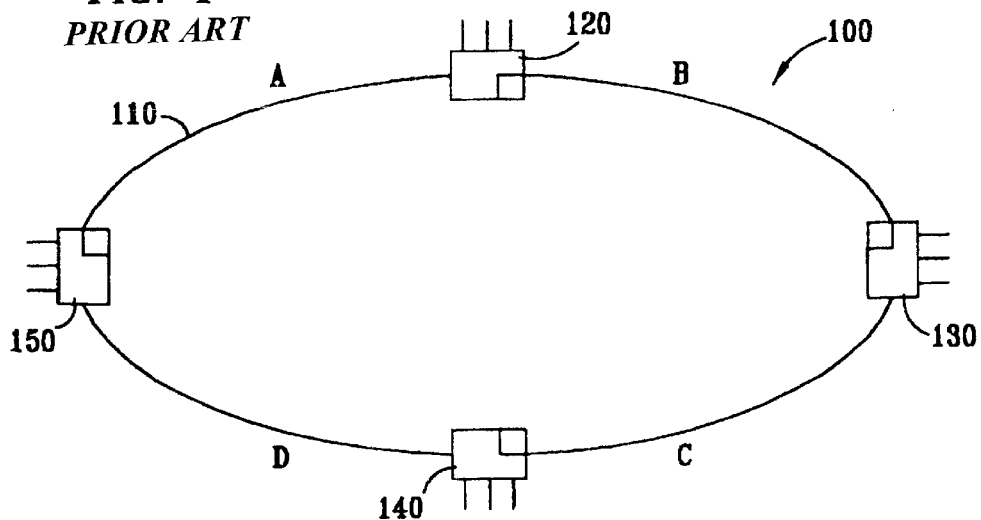
FIG. 1 illustrates a prior art self healing ring architecture.
Figure 2:
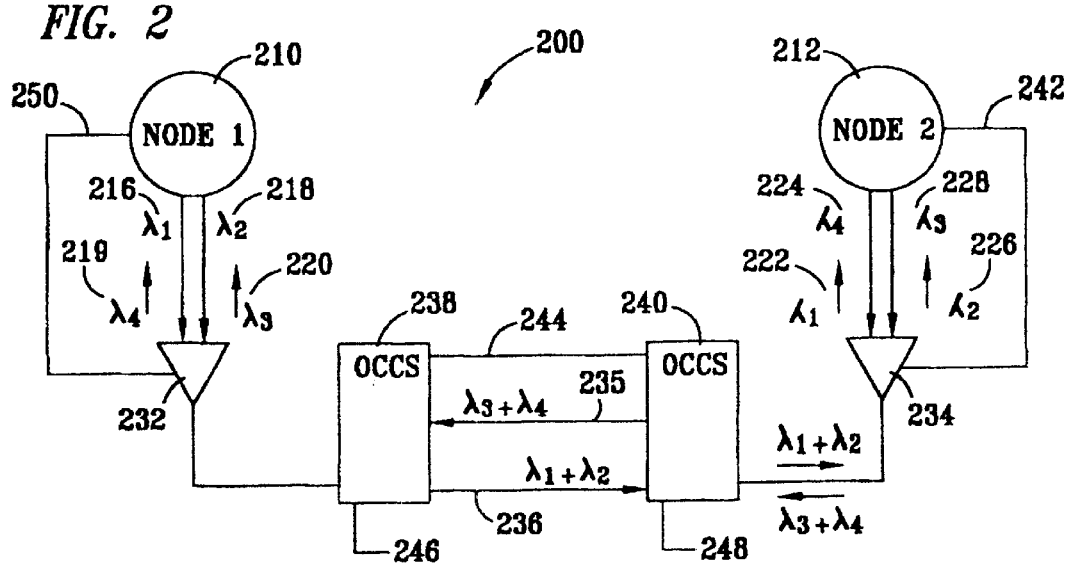
FIG. 2 illustrates a block diagram of a minimized rerouting switch of the present invention.

Referring now to FIG. 2, communications system 200 includes Node1 210 and Node2 212 connected via communication link 244, which in the preferred embodiment is a fiber optic connection with its associated switching components (not shown).

Node1 210 and Node2 212 are also operably connected by redundant communication links 235,236. Optical cross connect switches (OCCS) 238,240 are placed in the connection path. OCCS 238 is associated with Node1 210 and OCCS 240 is associated with Node2 212. OCCSes 238,240, typically 16×16 mechanical fiber optic switches in a preferred embodiment, serve to switch traffic among a number of desired routes via various fiber optic paths physically connected to each OCCS output port (not shown). The OCCSes need not be mechanical and may be M×N sized.

Connected between Nodes 210,212 and OCCSes 238,240 are wavelength division multiplexers 232,234. Wavelength division multiplexers 232,234 serve to bundle 2 or more signals from distinct fiber optic cables into a single cable prior to entry into the OCCS. As the OCCS is an expensive device with finite capacity, bundling is desirable as it at least doubles the capacity of a port of the OCCS. Wavelength division multiplexers 232,234 are bi-directional devices which transmit and receive in opposite directions along separate fiber cables. Forward signals of a given wavelength $\lambda_1$ 216 (red) and $\lambda_2$ 218 (blue) are transmitted from Node1 210 to wavelength division multiplexer 232 where they are bundled together for transmission to OCCS 238, transmitted to OCCS 240 via fiber optic cable 236. The bundled signal is then routed to wavelength division multiplexer 224, where it is unbundled into its constituent components $\lambda_1$ 222 (red) and $\lambda_2$ 228 (blue) for transmission to Node2 212.

Only 2 nodes and a single matched pair of OCCSes are shown for simplicity. Any number of nodes, wavelength division multiplexers and OCCSes with associated cabling may be used.

Control routing information is provided to each component over a data control link 242,246,248,250 from an external control source, or may be supplied from in-band signalling. The link may be any type of central or distributed control architecture. In the preferred embodiment, an X.25 distributed link is used to reduce the possibility of catastrophic single point failures. However, it is possible to collocate the control source with the individual component to be controlled.

The return communication process system will now be described. Such a process would be included in a full duplex communication system, for example, as well as with other communication system types.

Signals $\lambda_3$ 226 red and $\lambda_0$ 224 blue are transmitted from Node2 212 to wavelength division multiplexer 234 where they are bundled into a composite signal, and transmitted on fiber optic cable to OCCS 240 where it is switched onto cable 235. Communication link 235 is routed to OCCS 238 where the signal is switched and routed to wavelength division multiplexer 232, unbundled into constituent components, $\lambda_3$ 220 and $\lambda_4$ 219 before being sent to Node1 210.

Again, control and routing information is provided in an analogous manner as with the forward connection path.

Figure 3:
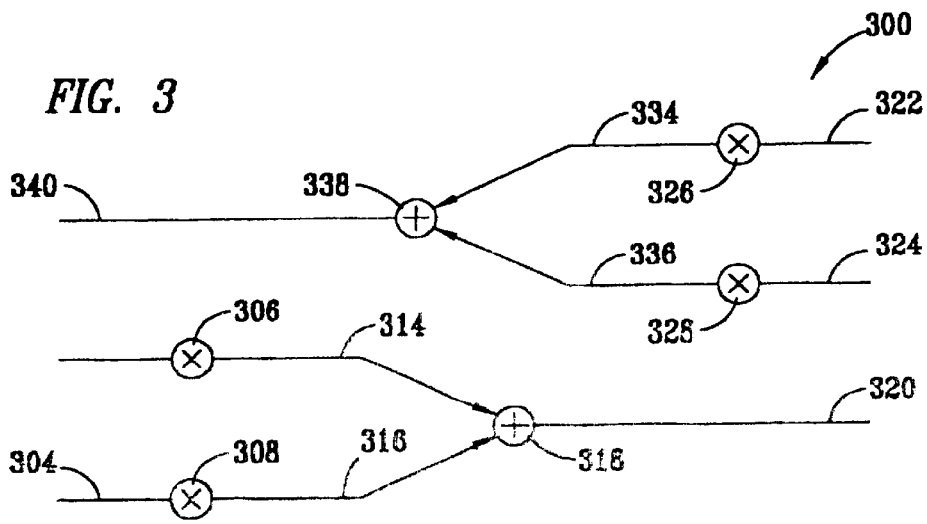
FIG. 3 illustrates a block diagram of a wavelength division multiplexer.

Referring now to FIG. 3, the block diagram of a wavelength division multiplexer 300 will now be described. Signals intended to be sent in a forward direction are sent in fiber optic inputs 302,304. Fiber optic inputs 302,304 are wavelength translated in first and second wavelength converters 306,308, respectively, set to a predetermined wavelength (frequency). If either input 302,304 does not need to have its wavelength translated, then the wavelength converter is set appropriately. The translated input signals are then sent along path 314,316 to optical combiner 318 where the signals are summed. The resultant bundled signal is output from the wavelength division multiplexer along fiber optic path 320.

As the wavelength division multiplexer is a bi-directional device, it is capable of handling communication signals along a two way path. In an analogous fashion, signals intended to be sent in a reverse direction are input in fiber optic inputs 322,324. Fiber optic inputs 322,324 are wavelength translated in third and fourth wavelength converters 326,328, respectively, set to a predetermined wavelength (frequency). If either input 322,324 does not need to have its wavelength translated, then the wavelength converter is set appropriately. The translated input signals are then sent along path 334,336 to optical combiner 338 where the signals are summed. The resultant bundled signal is output from the wavelength division multiplexer along fiber optic path 340.

Figure 4:
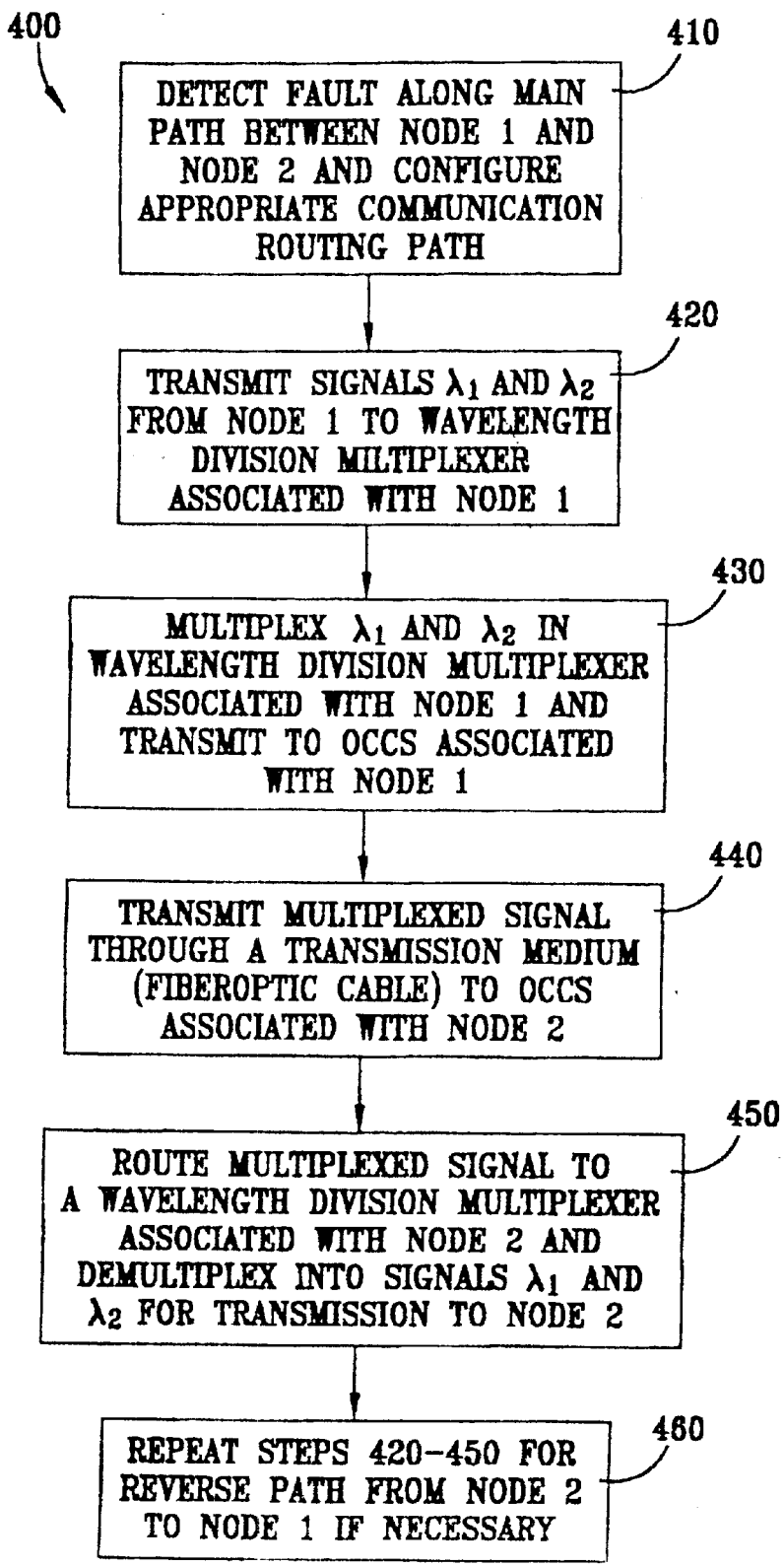
FIG. 4 illustrates a flowchart of the method of operation of rerouting a signal.

Referring now to FIG. 4, flowchart 400 depicts the method of operation of the instant invention. In step 410, a fault along main communication path 244 (FIG. 2.) has been detected by an external detection device and a signal indicating the requirement,for rerouting optionally is sent to Node1 210 and wavelength division multiplexers 232,234. However, in a preferred embodiment of the present invention, the, rerouting information need only be sent to OCCSes 238,240. An appropriate communication routing path is then configured according to a predetermined algorithm delivered from an external source along communication paths 242,244, 246,248.

In step 420, forward signals of a given wavelength $\lambda_1$ 216 (red) and $\lambda_2$ 218 (blue) are transmitted from Node1 210 to wavelength division multiplexer 232 where they are bundled in step 430 together for transmission to OCCS 238, transmitted to OCCS 240 in step 440 via fiber optic cable 236. In step 450, the bundled signal is then routed to wavelength division multiplexerr 234 where it is unbundled into its constituent components $\lambda_1$ 222(red) and $\lambda_2$ 228 (blue) for transmission to Node2 212.

In step 460, the process is repeated in an analogous fashion with similar references to the reverse channel depicted in FIG. 2 if it is decided that a full-duplex or a return channel is desired.

Figure 5:
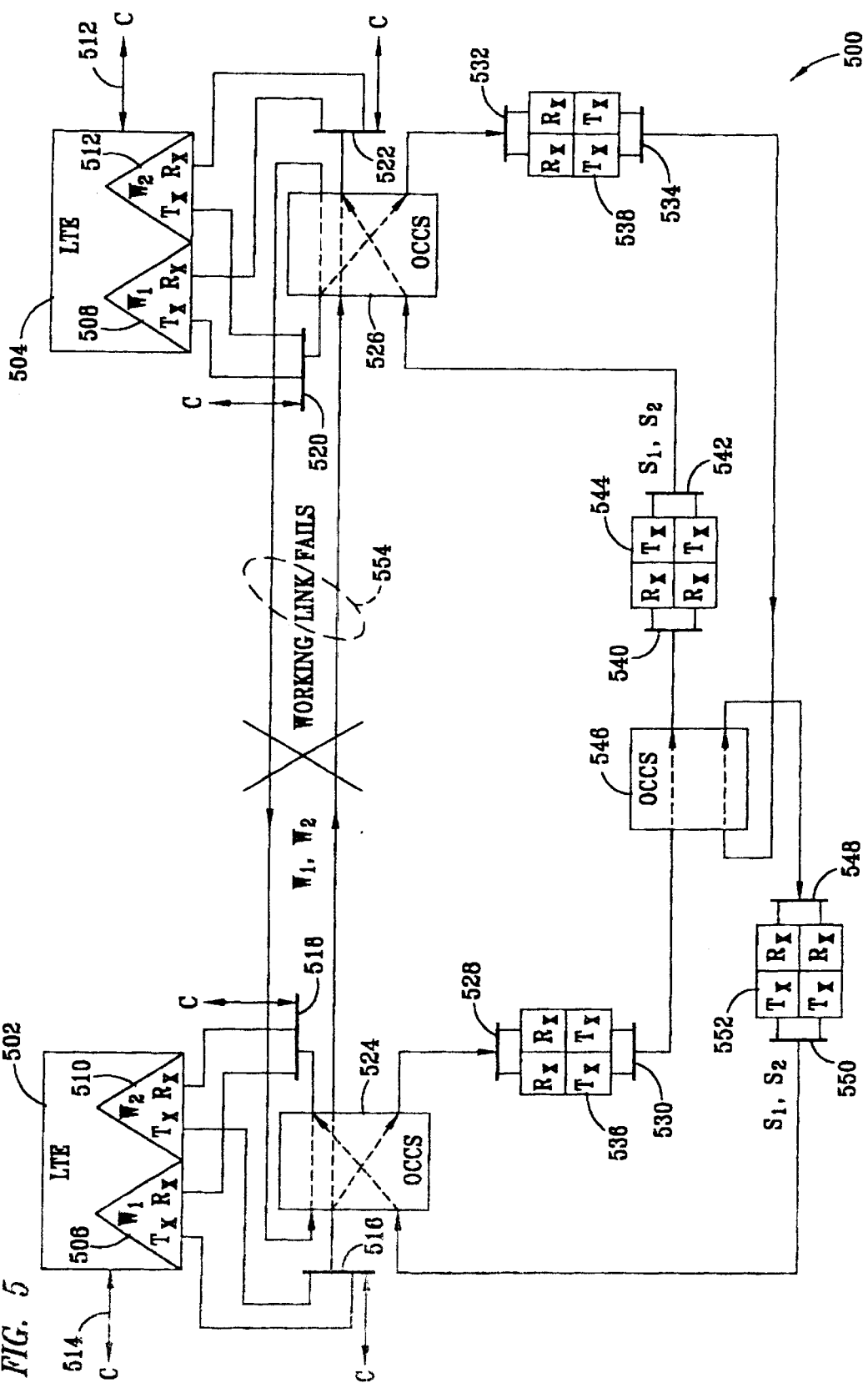
FIG. 5 is a more detailed block diagram of the system block diagram of the present invention.

FIG. 5 illustrates another embodiment of the present invention in which the red band is defined to be approximately 1547.5–1561.0 nm and the blue band is defined to be approximately 1527.5–1542.5 nm.

Line Terminating Equipment 502,504 (LTE), for example, Nortel S/DMS OC-12, OC-48 or OC-192 are connected via main connection path 554 which utilizes wavelength division multiplexers 516,518,520,522 and OCCSes 524,526 in a manner similar to that described above with respect to FIG. 2. The main difference is that LTE 502,504 has already delivered the signals already in the red and blue band wavelengths so that no signal conversion is required. At LTE 502 red and blue forward transmit signals are bundled together by wavelength division multiplexer 516, and switched in OCCS 524 for transmission over link 554, switched at OCCS 526, unbundled by wavelength division multiplexer 522 for reception at LTE 504.

Likewise, LTE 504 transmits return red and blue transmit signals which are bundled by wavelength division multiplexer 520, switched by OCCS 526, transmitted on link pair 554, switched by OCCS 524 and unbundled by wavelength division multiplexer 518 before transmission to LTE 502.

Upon a failure reported for any portion of link pair 554, traffic is rerouted between LTEs 502,504 through OCCSes 524,526,546. Note that the addition of OCCS 546 allows illustration of alternate routing through other portions of the network and re-use of alternate paths for: different nodes in the network which are not shown.

Control and predetermined routing information is again supplied from an external source through control links labeled C.

Note that wavelength division multiplexers 528,530,532, 534,540,542,548,550 along with optical repeaters 536,538, 544,552 are used if signal regeneration across a long distance is required. Such components may be eliminated or replaced with more expensive wideband optical repeaters when feasible.

Other such embodiments of the invention will be apparent to those skilled in the art from consideration of the specification and practice of the invention disclosed herein. It is readily apparent that the above described invention may be implemented in any type of fiber optic communication system including both Asynchronous and Synchronous Optical Network (SONET) configuration with any number of underlying transmission protocols such as Asynchronous Transfer Mode, (ATM). However, it is intended that the above described invention has applications in any type of communication system through any type or combination of transmission media or with any compatible protocol. It is intended that the specification and examples be considered as exemplary only, with a true scope and spirit of the invention being indicated by the following claims.

What is claimed is:

1. A communication system for redundantly connecting a plurality of nodes in a network environment comprising:
    a first connection path operably connecting a first node and second node;
    a second connection path operably connecting said first node and said second node;
    a first data signal of a first predetermined characteristic and a second data signal of a second predetermined characteristic routed in a first direction from said first node to said second node along said first connection path before detection of a specified event; and
    a first wavelength division multiplexer for combining the first data signal with the second data signal into a first composite signal routed by at least one cross connect switch in the first direction along said second connection path upon the detection of the specified event.

2. A communication system as in claim 1 further comprising:
    a second wavelength division multiplexer corresponding to said second node for receiving and demultiplexing said first composite signal into constituent components corresponding to said first and second signals; said second wavelength division multiplexer additionally for multiplexing a third signal with a third predetermined characteristic with a fourth signal with a fourth predetermined characteristic to form a second composite signal for transmission in a second direction from said second wavelength division multiplexer to said first wavelength division multiplexer for reception and demultiplexing said second composite signal into constituent components corresponding to said third and fourth signals.

3. A communication system as in claim 2 wherein further said specified event is a fault condition.

4. A communication system as in claim 3 wherein said first, second, third and fourth predetermined characteristics are wavelength.

5. A communication system as in claim 4 wherein said first and third predetermined characteristics are of the same wavelength range.

6. A communication system as in claim 5 wherein said second and fourth predetermined characteristics are selected from within the same wavelength range.

7. A communication system as in claim 6 wherein the wavelength range of said first and third wavelength and the wavelength range of said second and fourth wavelength are selected from within a different wavelength range.

8. The system as in claim 1 wherein the first data signal is not identical to the second data signal.

9. A method of communicating among a plurality of nodes in a fault tolerant network with multiple path connections among nodes, the method including the steps of:
    transmitting a first data signal and a second data signal of differing wavelengths along a first path connection between a first and a second node;
    receiving a signal indicative of a fault condition along said first path connection between said first and said second node;
    routing traffic from said first path connection, said routing being in response to said signal, along a second path from said first node to said second node using at least one cross connect switch, said second path containing first and second wavelength division multiplexers for concentrating additional traffic between nodes;
    multiplexing said first data signal with said second data signal into a combined signal for transmission on said second path; and
    demultiplexing said combined signal into said first and second data signals by a demultiplexer associated with said second node.

10. A method of communicating as in claim 9 further including the steps of:
    routing traffic from said second node to said first node on a selected path from said second node to said first node by multiplexing, with a multiplexer associated with said second node, a third signal and a fourth signal of differing wavelengths into a second combined signal for transmission on said selected path; and
    demultiplexing said second combined signal into said third and fourth signals by a demultiplexer associated with said first node.

11. A method of communicating as in claim 10 wherein said selected path is equivalent to said second path.

12. A method of communicating as in claim 11 wherein said selected path includes portions equivalent to said second path.

13. A method of communicating as in claim 12 wherein said selected path includes portions equivalent to said first path.

14. A communication system for communicating among a plurality of nodes in a fault tolerant network with multiple path connections among nodes including:
    means for transmitting a first data signal and a second data signal of differing wavelengths along a first path connection between a first and a second node;

means for detecting a fault condition along said first path connection between said first and said second node;

means for routing traffic from said first path connection along a second path from said first node to said second node, wherein said routing is in response to said fault condition and said means for routing traffic uses at least one cross connecting means;

means for multiplexing said first data signal with said second data signal into a combined signal for transmission on said second path; and means for demultiplexing said combined signal into said first and second data signals by a demultiplexer associated with said second node.

15. A communication system as in claim 14 further including:

means for routing traffic from said second node to said first node on a selected path from said second node to said first node by multiplexing, with a means for multiplexing associated with said second node, a third signal and a fourth signal of differing wavelengths into a second combined signal for transmission on said selected path;

means for demultiplexing associated with said first node said second combined signal into said third and fourth signals.

16. A communication system as in claim 15 wherein said selected path is equivalent to said second path.

17. A communication system as in claim 16 wherein said selected path includes portions equivalent to said second path.

18. A communication system as in claim 17 wherein said selected path includes portions equivalent to said first path.

* * * * *